(12) United States Patent
Carrow et al.

(10) Patent No.: US 12,524,779 B2
(45) Date of Patent: Jan. 13, 2026

(54) SYSTEMS, METHODS, AND APPARATUS FOR THE DISPLAY OF STORED-VALUE CARDS

(71) Applicant: Blackhawk Network, Inc., Pleasanton, CA (US)

(72) Inventors: Michael Andrew Carrow, Walnut Creek, CA (US); Jack Kirk Hu, Pleasanton, CA (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

(21) Appl. No.: 17/494,661

(22) Filed: Oct. 5, 2021

(65) Prior Publication Data

US 2022/0108349 A1    Apr. 7, 2022

Related U.S. Application Data

(60) Provisional application No. 63/087,469, filed on Oct. 5, 2020.

(51) Int. Cl.
*G06Q 30/0241*    (2023.01)

(52) U.S. Cl.
CPC .............................. *G06Q 30/0241* (2013.01)

(58) Field of Classification Search
CPC ............ G06Q 30/0207–0277; G06Q 30/0241
USPC ............. 705/14.4; 211/186, 153; D6/678.3; 206/39, 455, 459.5; 248/220.42; 40/654.01, 124.06
See application file for complete search history.

(56) References Cited

U.S. PATENT DOCUMENTS

| | | | | |
|---|---|---|---|---|
| 3,191,776 | A * | 6/1965 | Tokash | A47F 7/145 211/50 |
| 3,394,973 | A * | 7/1968 | Scott | A47F 5/103 211/55 |
| 4,801,023 | A * | 1/1989 | Ecclestone | A47F 7/144 D6/678.3 |
| 5,485,934 | A * | 1/1996 | Holztrager | A47F 5/0846 211/126.2 |
| 6,289,618 | B1 * | 9/2001 | Kump | A47F 5/0823 248/220.42 |
| 6,349,491 | B1 * | 2/2002 | Able | G09F 1/10 40/124.06 |
| 6,427,838 | B1 * | 8/2002 | Fulda | B42F 5/00 206/455 |

(Continued)

FOREIGN PATENT DOCUMENTS

CA    3090093 A1 *    2/2021    .............. A47F 5/01

OTHER PUBLICATIONS

Deal Editor, How to use Self Checkout At Target, May 11, 2015, Simple Coupon Deals (Year: 2015).*
Stampnstorage, Multi-Level Card Holder, 2020 (Year: 2020).*

*Primary Examiner* — Tarek Elchanti
(74) *Attorney, Agent, or Firm* — Barnes & Thornburg LLP; Jerry C. Harris, Jr.

(57) ABSTRACT

Methods, systems, and apparatus for the placement, retention, display, marketing, selection, removal, or combinations thereof, of a stored-value card. More specifically disclosed herein are systems, methods, and apparatus for the placement, retention, display, marketing, selection, removal, or combinations thereof, of a stored-value card associated with an offer for sale of the stored-value card, an advertisement of a stored-value card, a potential purchase by a customer of the stored-value card, or combinations thereof.

17 Claims, 5 Drawing Sheets

(56) References Cited

U.S. PATENT DOCUMENTS

| | | | | |
|---|---|---|---|---|
| 8,286,863 | B1* | 10/2012 | Brooks | G06Q 20/355 235/487 |
| 8,826,573 | B1* | 9/2014 | Morera | G09F 3/20 40/654.01 |
| 9,119,489 | B2* | 9/2015 | Buettner | A47F 7/147 |
| 2003/0217936 | A1* | 11/2003 | Nourian | A45F 5/00 206/39 |
| 2004/0200787 | A1* | 10/2004 | Chandaria | A47F 7/00 211/13.1 |
| 2007/0045404 | A1* | 3/2007 | Andersen | G06Q 20/20 235/380 |
| 2008/0078728 | A1* | 4/2008 | Hodge | A47F 5/0846 211/55 |
| 2009/0151211 | A1* | 6/2009 | Alyn | A47F 5/0807 40/605 |
| 2010/0282697 | A1* | 11/2010 | Weigand | A47F 7/144 211/153 |
| 2012/0085829 | A1* | 4/2012 | Ziegler | G09F 3/14 235/487 |
| 2012/0271712 | A1* | 10/2012 | Katzin | G06Q 20/387 705/14.51 |
| 2014/0054187 | A1* | 2/2014 | Glass | B65D 75/368 206/307 |
| 2015/0025969 | A1* | 1/2015 | Schroll | G06Q 20/208 705/14.64 |
| 2015/0129528 | A1* | 5/2015 | Brozak | A47B 47/05 211/186 |
| 2016/0125769 | A1* | 5/2016 | Cox | A45C 13/02 206/459.5 |
| 2019/0130347 | A1* | 5/2019 | Boal | G06Q 10/087 |
| 2021/0045550 | A1* | 2/2021 | Santarelli | E21B 3/00 |
| 2022/0053897 | A1* | 2/2022 | Ganino | A45C 7/0077 |
| 2022/0108349 | A1* | 4/2022 | Carrow | G06Q 30/0241 |

* cited by examiner

SYSTEMS, METHODS, AND APPARATUS FOR THE DISPLAY OF STORED-VALUE CARDS

BACKGROUND

Positioning of consumer products is critical for product promotion and sales. Products that are more visible and more accessible to consumers are much more likely to be purchased, particularly if the products are more visible and more accessible to consumers at a time when a consumer is more, or most likely, to make a purchasing decision, e.g., at or near the point of sale.

A consumer's interaction at a point of sale often involves the consumer being physically separated from other points of sale and/or a point of sale clerk by apparatus designed to restrict the spread of airborne pathogens (or other substances), e.g., a glass or acrylic sheet/panel, while still providing the consumer to observe and interact with the point of sale and/or sales clerk with minimal visual obstruction.

Typically, when stored-value cards are sold in stores, the stored-value cards are located on aisles or display fixtures which are spatially and/or temporally removed/distant from a point of sale. As a result, the possibility of capitalizing on a consumer's willingness to make a purchasing decision is reduced, as the location of the stored-value cards prevents and/or inhibits a consumer's ability to decide to purchase a stored-value card at the time the consumer is engaged, or preparing to engage, in its purchasing transaction to complete its shopping experience. As such, there is a need for an independent structure that can be attached at or proximate to the point of sale, e.g., attached and/or secured to glass or acrylic sheet/panel separating a consumer from a sales clerk at a point of sale, to display a stored-value card to enhance and increase to possibility that a consumer will decide to purchase the stored-value card at the time the consumer is making and engaging in its purchasing decision(s)/transaction(s). The aspects described in this disclosure solve this need, among others.

SUMMARY

Generally disclosed herein are methods, systems, and apparatus for the placement, retention, display, marketing, selection, removal, or combinations thereof, of a stored-value card. More specifically disclosed herein are systems, methods, and apparatus for the placement, retention, display, marketing, selection, removal, or combinations thereof, of a stored-value card associated with an offer for sale of the stored-value card, an advertisement of a stored-value card, a potential purchase by a customer of the stored-value card, or combinations thereof.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
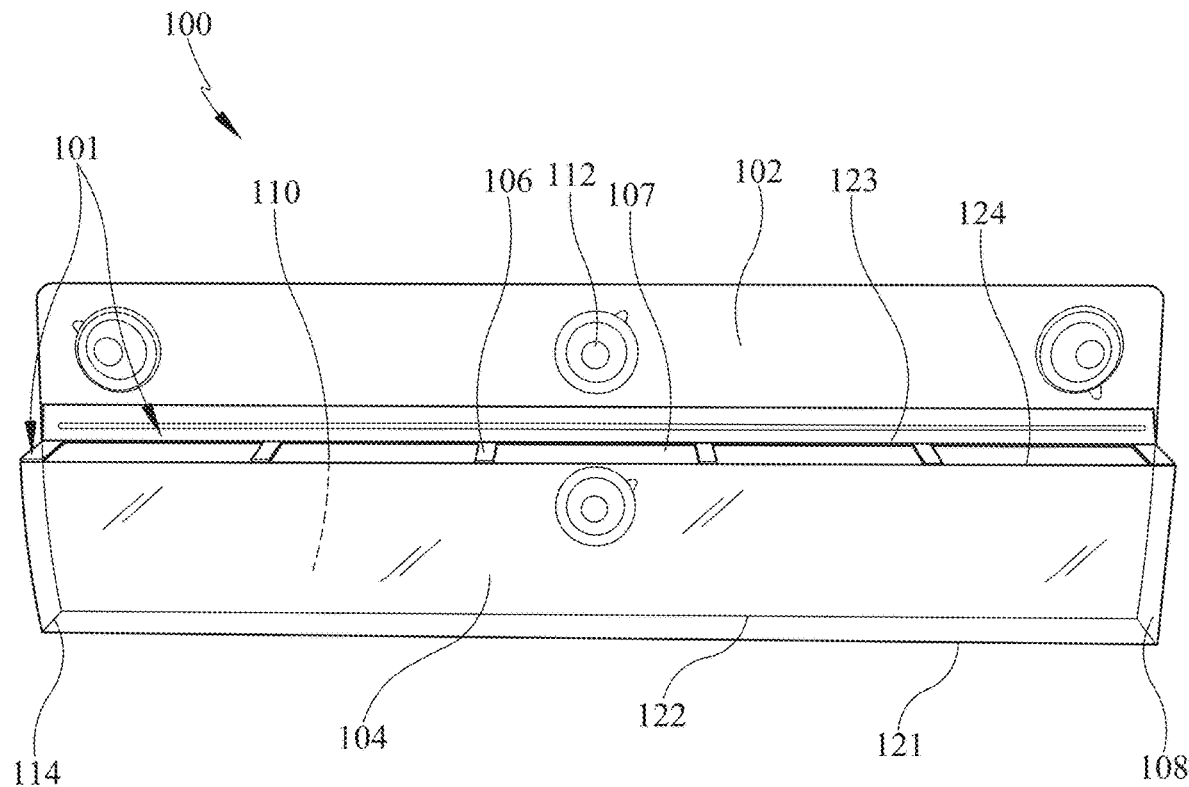
FIG. 1 illustrates a front perspective view of a stored-value card display fixture according to an embodiment of the disclosure.

Disclosed herein is a stored-value card display fixture which is designed hold at least one stored-value card for presentation at a point of sale, making the stored-value card more likely to be purchased. While various embodiments, features, and arrangements of the stored-value card display fixture are described herein, the scope of any invention is not limited to the embodiments described or shown in the figures, as would be understood by one having ordinary skill in the art.

In an embodiment, the stored-value card display fixture is fashioned from a polymer.

In an embodiment the polymer comprises, low density polyethylene, high density polyethylene, polypropylene, polyvinyl chloride, polystyrene, polyurethane, or combinations thereof.

In an embodiment the polymer comprises polyethylene terephthalate.

In an embodiment the polymer comprises polyethylene furanoate.

In an embodiment the polymer comprises polycaprolactone, polyhydroxyalkanoate polyesters, polylactic acid, or combinations thereof.

In an embodiment, the stored-value card display fixture comprises a lightweight material.

In an embodiment, the stored-value card display fixture comprises a flexible material.

In an embodiment, the stored-value card display fixture comprises a lightweight, flexible material.

In an embodiment, the stored-value card display fixture comprises a rigid material.

In an embodiment, the stored-value card display fixture comprises a lightweight, rigid material.

In an embodiment the stored-value card display fixture comprises a color-modifiable appearance and/or an opacity modifiable appearance, wherein the color-modifiable/opacity modifiable appearance is caused, at least in part by, a thermochromic indicator, a pressure-chromic indictor, or combinations thereof.

In an embodiment, wherein the color-modifiable/opacity modifiable appearance is caused by a thermochromic indicator, the thermochromic indicator comprises a touch activated liquid crystal pigment, a cold activated thermochromic ink, a touch activated thermochromic ink, a heat activated thermochromic ink, a high temperature thermochromic pigment, a temperature sensitive coating comprising a solid crystalline material, or combinations thereof.

In an embodiment, wherein the color-modifiable/opacity modifiable appearance is caused by a pressure-chromic indicator, the pressure-chromic indicator comprises a pressure sensitive film, a pressure sensitive paint, a strain reactive polymer, or combinations thereof.

In an embodiment the stored-value card display fixture comprises a substantially transparent material.

In an embodiment, the stored-value card display fixture comprises a back portion, a front portion a bottom portion, and a top portion.

In an embodiment, the top portion is configured to affix and/or secure to the back portion.

In an embodiment the top portion is configured with at least one opening which allows for the introduction and/or placement of a stored-value card, a chit comprising a product/offer/opportunity identifier (e.g., a QR code, a magnetic stripe, a bar code, RAID tag, or other readable indicia), a stored-value card package, or combinations thereof (hereinafter, collectively, a singular "product" or a plurality of "products"), wherein the introduction and/or placement of the product comprises the product being located between the front portion and the back portion of the stored-value card display fixture.

In an embodiment, when the product is located between the front portion and the back portion of the stored-value card display fixture, the product contacts and/or is supported by the bottom portion.

In an embodiment, when the product is located between the front portion and the back portion of the stored-value card display fixture, the product contacts and/or is supported by a cross-member portion affixed to or comprising the front portion and/or the back portion.

In an embodiment, when the product is located between the front portion and the back portion of the stored-value card display fixture, the part(s) of the top portion defining the opening and the bottom portion are substantially parallel.

In an embodiment, when the product is located between the front portion and the back portion of the stored-value card display fixture, the part(s) of the top portion defining the opening defines a first plane and the bottom portion defines a second plane.

In an embodiment, when the product is located between the front portion and the back portion of the stored-value card display fixture, the front portion and the back portion are substantially parallel.

In an embodiment, when the product is located between the front portion and the back portion of the stored-value card display fixture, the front portion defines a first plane and the back portion defines a second plane.

In an embodiment, the area defined by the opening in the top portion, the space between the front portion and the back portion concomitant with the opening in the top portion, and the bottom portion concomitant with the space between the front portion and the back portion concomitant with the opening in the top portion comprises a pocket for the product.

In an embodiment, the front portion is configured with at least one orifice which allows for the introduction and/or placement of a product, wherein the space between the front portion and the back portion, beginning at the orifice and terminating below the orifice at either (1) a cross-member portion affixed to or comprising the front portion and/or the back portion or (2) the bottom portion defines a pocket for the product.

In an embodiment, the stored-value card display fixture comprises a plurality of pockets.

In an embodiment, e.g., a "landscape" embodiment, the plurality of pockets are separated by parts of the top portion which act to define individual openings of the plurality of pockets.

In an embodiment, e.g., a "landscape" embodiment, the plurality of pockets are oriented side-by-side, horizontally.

In an embodiment, e.g., a "portrait" embodiment, the plurality of pockets are separated by the distance between a cross-member which defines a pocket with an opening in the top portion and an orifice in the front portion. In an embodiment, e.g., a "portrait" embodiment, the plurality of pockets may also be are separated by the distance between a cross-member which acts to define a pocket with a first orifice in the front portion and a second orifice in the front portion which acts to define another pocket.

In an embodiment, the plurality of pockets are oriented top-to-bottom, vertically.

In an embodiment, each pocket of the stored-value card display fixture is configured to accept, hold, and/or display a plurality of products.

In an embodiment, an indicia of a product and/or multiple indicia of different products may be affixed or otherwise associated with the stored-value card display fixture such that a customer may scan, read, and or otherwise interpret selected product indicia and provide (or have provided) the selected product indicia to the point of sale to effectuate the customer's purchase, selection of an offer or opportunity (e.g., lottify a product), and/or activation of the selected product, all without removing any product or item from the stored-value card display fixture.

In an embodiment, the front portion, back portion, top portion, bottom portion, or combinations thereof may be manufactured, constructed, and/or produced in varying sizes.

In an embodiment, the front portion may have a length in the range of about 2 inches to about 48 inches.

In an embodiment, the back portion may have a length in the range of about 2 inches to about 48 inches.

In an embodiment, the top portion may have a length in the range of about 2 inches to about 48 inches.

In an embodiment the bottom portion may have a length in the range of about 2 inches to about 48 inches.

In an embodiment, the front portion may have a width in the range of about 2 inches to about 48 inches.

In an embodiment, the back portion may have a width in the range of about 2 inches to about 48 inches.

In an embodiment, the top portion may have a width in the range of about 2 inches to about 48 inches.

In an embodiment the bottom portion may have a width in the range of about 2 inches to about 48 inches.

In an embodiment, the front portion may have a thickness in the range of about 0.01 inches to about 3 inches.

In an embodiment, the back portion may have a thickness in the range of about 0.01 inches to about 3 inches.

In an embodiment, the top portion may have a thickness in the range of about 0.01 inches to about 3 inches.

In an embodiment the bottom portion may have a thickness in the range of about 0.01 inches to about 3 inches.

In an embodiment, the at east one pocket may have a length in the range of about 1 inch to about 6 inches.

In an embodiment, the at least one pocket may have a width in the range of about 2 inches to about 6 inches.

In an embodiment, the at least one pocket may have a depth in the range of about 0.01 inches to about 6 inches.

In an embodiment, the stored-value card display fixture is configured to be attached, connected, engaged, and/or affixed to another substrate, wherein the substrate comprises a wall, a shelf, a door, a window, a point of sale divider, a point of sale screen, a case, a rack, or combinations thereof.

In an embodiment, the substrate to which the stored-value card display fixture is attached, connected, engaged, affixed, and/or otherwise associated comprises glass, metal, wood, a polymer, a composite, or combinations thereof.

In an embodiment, wherein the stored-value card display fixture is configured to be attached, connected, engaged, and/or affixed to a polymer, the polymer may comprise poly(methyl methacrylate) (PMMA).

In an embodiment, the stored-value card display fixture comprises at least one affixing component configured to affix, attach, adhere, secure, bond, connect, or otherwise join the stored-value card display fixture to the other substrate.

In an embodiment, the affixing component comprises a magnet, a suction cup, a hook and loop fastener, Velcro®, an adhesive, tape, double-sided tape, glue, a snap, a button, a zipper, a hook, a pin, a nail, a screw, or combinations thereof.

In an embodiment, the stored-value card display fixture comprises a plurality of affixing components.

In an embodiment, the plurality of affixing components a located on the back portion of the stored-value card display fixture and placed in a manner in which upon engagement with the other substrate, the interaction of the affixing components and the other substrate inhibit and/or prevent rotation of the stored-value card display fixture about an axis parallel with the plane of the other substrate.

In an embodiment, the stored-value card display fixture is configured and utilize the location of the center of gravity of the stored-value card display fixture, friction, leverage, or combinations thereof to suspend the stored-value card display fixture from the other substrate. In embodiment, the stored-value card display fixture comprises a hook-like device attached to the stored-value card display fixture to engage the top edge of the other substrate, e.g., the stored-value card display fixture is configured to hang from the other substrate. In embodiment, the back portion of the stored-value card display fixture is configured to engage the top edge of the other substrate, e.g., the stored-value card display fixture is configured to hang from the other substrate.

In an embodiment, the stored-value card display fixture is configured to be attached or suspended from the other substrate in a manner in which the pocket(s) of the stored-value card display are accessible by a customer. In an embodiment, a customer may select and remove a product from the stored-value card display fixture.

In an embodiment, the stored-value card display fixture is configured to be attached or suspended from the other substrate in a manner in which the pocket(s) of the stored-value card display are inaccessible to a customer. In an embodiment, a customer may select a product from the stored-value card display fixture and then request a clerk or other store employee remove the product from the stored-value card display fixture, which is inaccessible to the customer, and present the customer-selected product to the customer. For example, in an embodiment, the stored-value card display fixture may be affixed to an interior facing portion of a window in a secured point of sale location, e.g., a clerk's booth at a service station, a toll booth, and/or a currency exchange booth, wherein, due to the transparency of both the window and the stored-value card display fixture, a customer can view the displayed products for selection, but must request that any such product be removed from the stored-value card display fixture by the occupant of the secured point of sale location and presented to the customer by said occupant due to the stored-value card display fixture being inaccessible to the customer.

In an embodiment, the stored-value card display fixture is manufactured, constructed, and/or produced from a single containing component, wherein the single containing component comprises the back portion, the front portion, the top portion, and the bottom portion, wherein the single containing component is folded, cut, scored, bent, or combinations thereof to form at least one pocket for holding and/or displaying a product.

In an embodiment, wherein the stored-value card display fixture is manufactured, constructed, and/or produced from a single containing component, the top portion is folded, cut, scored, bent, or combinations thereof to form at least two distinct sections, wherein the at least two distinct sections define at least two distinct planes.

In an embodiment, wherein the top portion is folded, cut, scored, bent, or combinations thereof to form at least two distinct sections and wherein the at least two distinct sections define at least two distinct planes, at least one of the sections is affixed to the back portion.

In an embodiment, the at least one of the sections of the top portion is affixed to the back portion via a magnet, a suction cup, a hook and loop fastener, Velcro®, an adhesive, tape, double-sided tape, glue, a snap, a button, a zipper, a hook, a pin, a nail, a screw, or combinations thereof.

In an embodiment, the stored-value card display fixture is manufactured, constructed, and/or produced from multiple containing components, wherein the multiple containing components comprise the back portion, the front portion, the top portion, and the bottom portion, wherein the multiple containing components are folded, cut, scored, bent, or combinations thereof to form at least one pocket for holding and/or displaying a product.

In an embodiment, wherein the stored-value card display fixture is manufactured, constructed, and/or produced from multiple containing components, the top portion is folded, cut, scored, bent, or combinations thereof to form at least two distinct sections, wherein the at least two distinct sections define at least two distinct planes.

In an embodiment, wherein the top portion is folded, cut, scored, bent, or combinations thereof to form at least two distinct sections and wherein the at least two distinct sections define at least two distinct planes, at least one of the sections is affixed to the back portion.

In an embodiment, the at least one of the sections of the top portion is affixed to the back portion via a magnet, a suction cup, a hook and loop fastener, Velcro®, an adhesive, tape, double-sided tape, glue, a snap, a button, a zipper, a hook, a pin, a nail, a screw, or combinations thereof.

In an embodiment, at least a part of the back portion extends beyond a part of the top portion.

In an embodiment, all of the back portion extends beyond a part of the top portion.

In an embodiment, all of the back portion extends beyond all of the top portion.

In an embodiment, at least a part of the top portion extends beyond a part of the back portion.

In an embodiment, all of the top portion extends beyond a part of the back portion.

In an embodiment, all of the top portion extends beyond all of the back portion.

In an embodiment, the stored-value card display fixture is located at a point of sale and positioned at a height above the height of a shopping cart.

In an embodiment, the stored-value card display fixture is configured to be shipped and/or stored in a manner in which the top portion and the back portion are substantially parallel (i.e., compressed configuration). Shipping and/or storing stored-value card display fixtures in a manner in which each of the stored-value card display fixtures comprise top portions and back portions which are substantially parallel reduces the space needed for storage (and or shipping) when the stored-value card display fixtures are stacked upon one another in compressed configurations.

In an embodiment, the stored-value card display fixture is configured to be converted from a compressed configuration, e.g., a stored and/or shipped configuration for reduced space requirements, into a presentation configuration, the presentation configuration configured for affixing to another substrate and/or displaying a product. Conversion from the compressed configuration to the presentation configuration may be accomplished by actuating the stored-value card display fixture along scored, folded, and/or bent portions of the back portion, bottom portion, and top portion until, at least, the stored-value card display fixture's at least one pocket is sufficiently sized to accept a product.

In an embodiment, the stored-value card display fixture is configured to be shipped and/or stored with its pocket(s) comprising stored-value card(s) and/or stored-value card package(s). In an embodiment, the stored-value card display fixture is configured to be shipped and/or stored in a manner in which, upon conversion from a compressed configuration to a presentation configuration, the stored-value card display fixture may be affixed to a substrate and thereby display the products contained within the pockets without any further action on the part of a merchant or clerk.

In an embodiment, the stored-value card display fixture comprises a color-modifiable appearance, wherein at least a portion of the stored-value card display fixture may be manipulated to appear in a different color, and/or with a different opacity, than the remainder of the stored-value card display fixture. In an embodiment, all of the stored-value card display fixture may be manipulated to appear in a different color, and/or with a different opacity, than the original color or opacity of the stored-value card display fixture. In an embodiment, the stored-value card display fixture may be manipulated in a manner such that a particular pocket or area surrounding a stored-value card, stored value card package, or other consumer selectable article or indicia, appears in a color or opacity different than that of the remainder of the stored-value card display fixture so as to draw attention to such color/opacity differentiated pocket/area. In an embodiment, a color differentiated pocket/area could be presented in a red color to indicate a "hot deal" or in red and green colors to emphasize a "holiday deal."

In an embodiment, the stored-value card display fixture comprises a notification component. In an embodiment, the notification component comprises a light emitting device, a sound emitting device, a motion generator, or combinations thereof. In an embodiment, the light emitting device may flash, pulse, blink, and/or provide a constant visible notification to attract the customer to the stored-value card display fixture. In an embodiment, the sound emitting device may chime, buzz, ping, play a song, play music, play a recorded statement, play a recorded advertisement, or combinations thereof. In an embodiment, the motion generator may cause the stored-value card display fixture to vibrate, shake, move up and down, move side to side, or combinations thereof. In an embodiment, the notification component may be activated based on a preset timer or schedule, wherein the preset timer or schedule is stored in a microprocessor of the notification component. In an embodiment, the notification component may be consumer activated. In an embodiment, the notification component comprises a sensor which can detect the proximity of a customer and upon such detection, a microprocessor in electronic communication with the sensor can cause the light emitting device, the sound emitting device, the motion generator, or combinations thereof to activate. In an embodiment, the notification component comprises a power supply for supplying energy for operating the light emitting device, the sound emitting device, the motion generator, or combinations thereof. In an embodiment, the notification component comprises a power storage device for storing energy for the notification device's functions. In an embodiment, the power supply may be provided energy via alternating current, direct current, or combinations thereof. In an embodiment, the power storage device may be provided energy via alternating current, direct current, or combinations thereof. In an embodiment, the notification device may comprise a solar cell to provide energy to the power supply, the power storage device, or combinations thereof, FIG. 1 illustrates a front perspective view of an exemplary stored-value card display fixture 100 comprising a back portion 102, a front portion 104, a top portion 106, a plurality of top portion openings 107, a bottom portion 108, a pocket 110, and an affixing component 112. As can be seen from the embodiment of stored-value card display fixture 100 of FIG. 1, the stored-value card display fixture 100 is manufactured from a single containing component 114 and comprises five pockets 110 formed from the actuation of fold areas 121, 122, 123, and 124.

Figure 2:
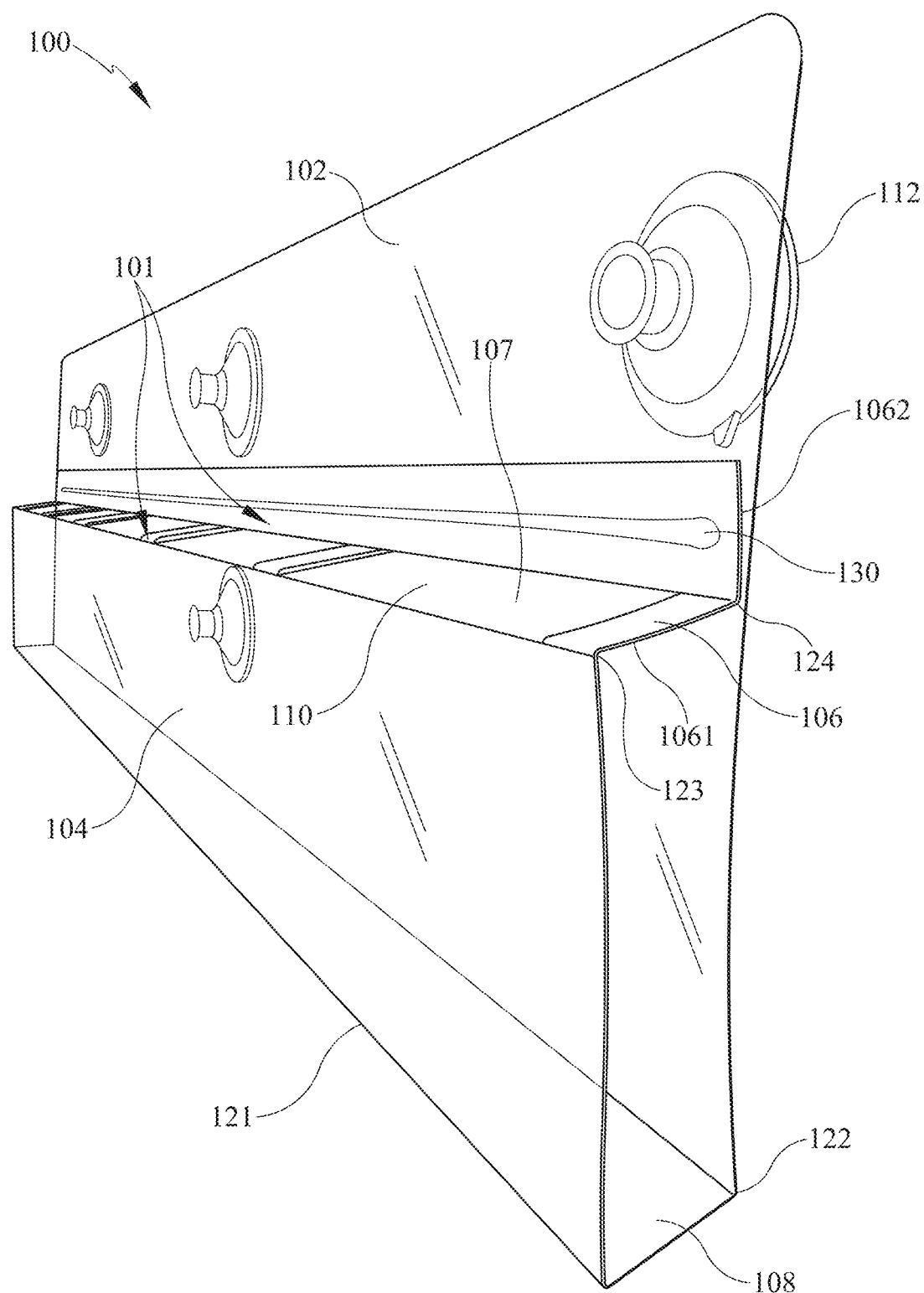
FIG. 2 illustrates a side perspective view of stored-value card display fixture in a presentation configuration according to an embodiment of the disclosure.

FIG. 2 illustrates a side perspective view of exemplary stored-value card display fixture 100 comprising a back portion 102, a front portion 104, a top portion 106 (wherein top portion 106 comprises a first section 1061 and a second section 1062), a plurality of top portion openings 107, a bottom portion 108, a pocket 110, and an affixing component 112. As can be seen from the embodiment of stored-value card display fixture 100 of FIG. 2, the stored-value card display fixture MO comprises five pockets 110 formed from the actuation of fold areas 121, 122, 123, and 124 and second section 1062 is affixed to back portion 102 via an adhesive 130.

As shown in FIGS. 1 and 2, the stored-value card display fixture 100 configured in the "presentation" configuration 101.

Figure 3:
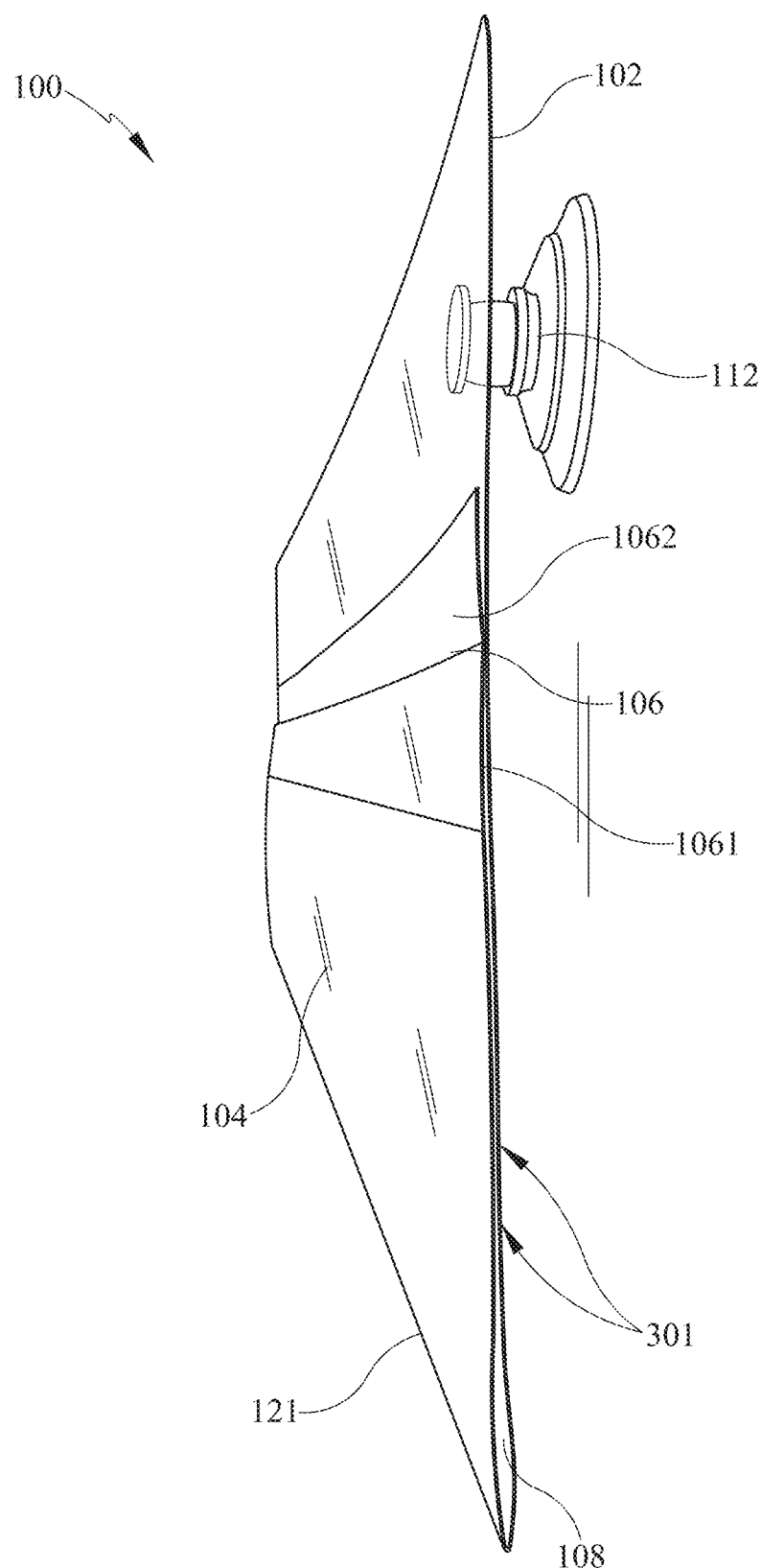
FIG. 3 illustrates a side perspective view of stored-value card display fixture in a compressed configuration according to an embodiment of the disclosure.

FIG. 3 illustrates a side perspective view of exemplary stored-value card display fixture 100 in the "compressed" configuration 301 comprising a back portion 102, a front portion 104, a top portion 106 (wherein top portion 106 comprises a first section 1061 and a second section 1062), a bottom portion 108. Fold area 121 and affixing component 112 are also shown in FIG. 3.

Figure 4:
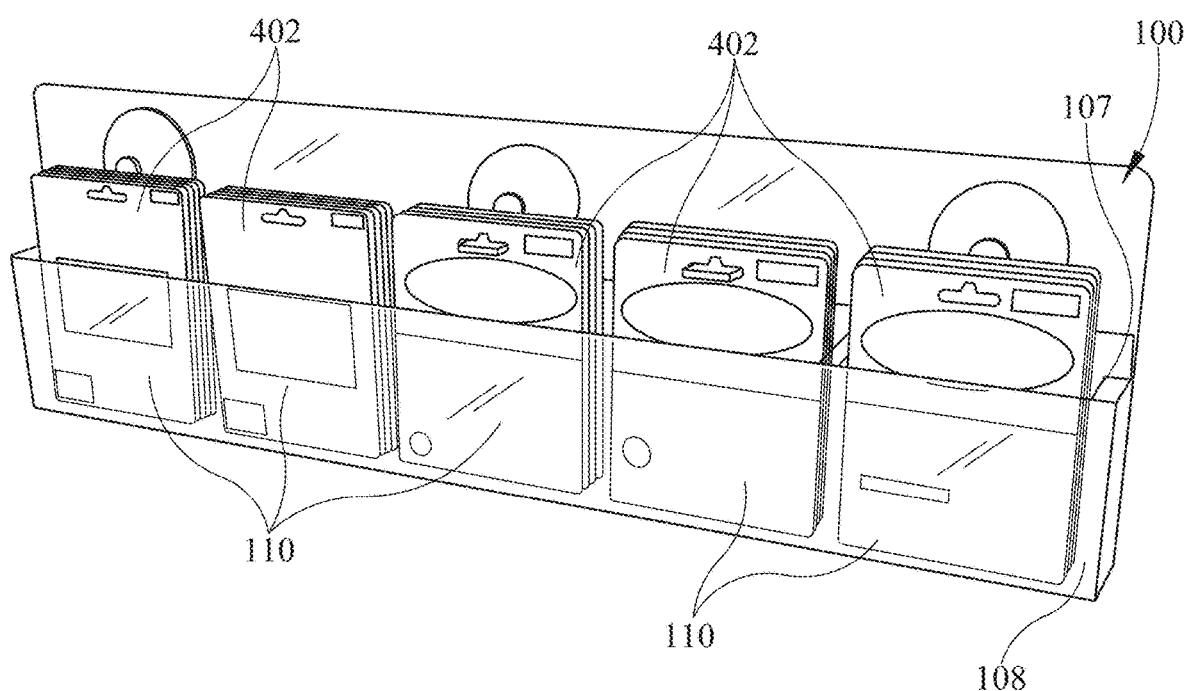
FIG. 4 illustrates a stored-value card display fixture located at a point of sale according to an embodiment of the disclosure.

FIG. 4 illustrates a front perspective view of an exemplary stored-value card display fixture 100 wherein pockets 110 comprise stored-value card packages 402 and wherein the stored-value card packages 402 are supported by bottom portion 108 and pass through top portion opening 107.

Figure 5:
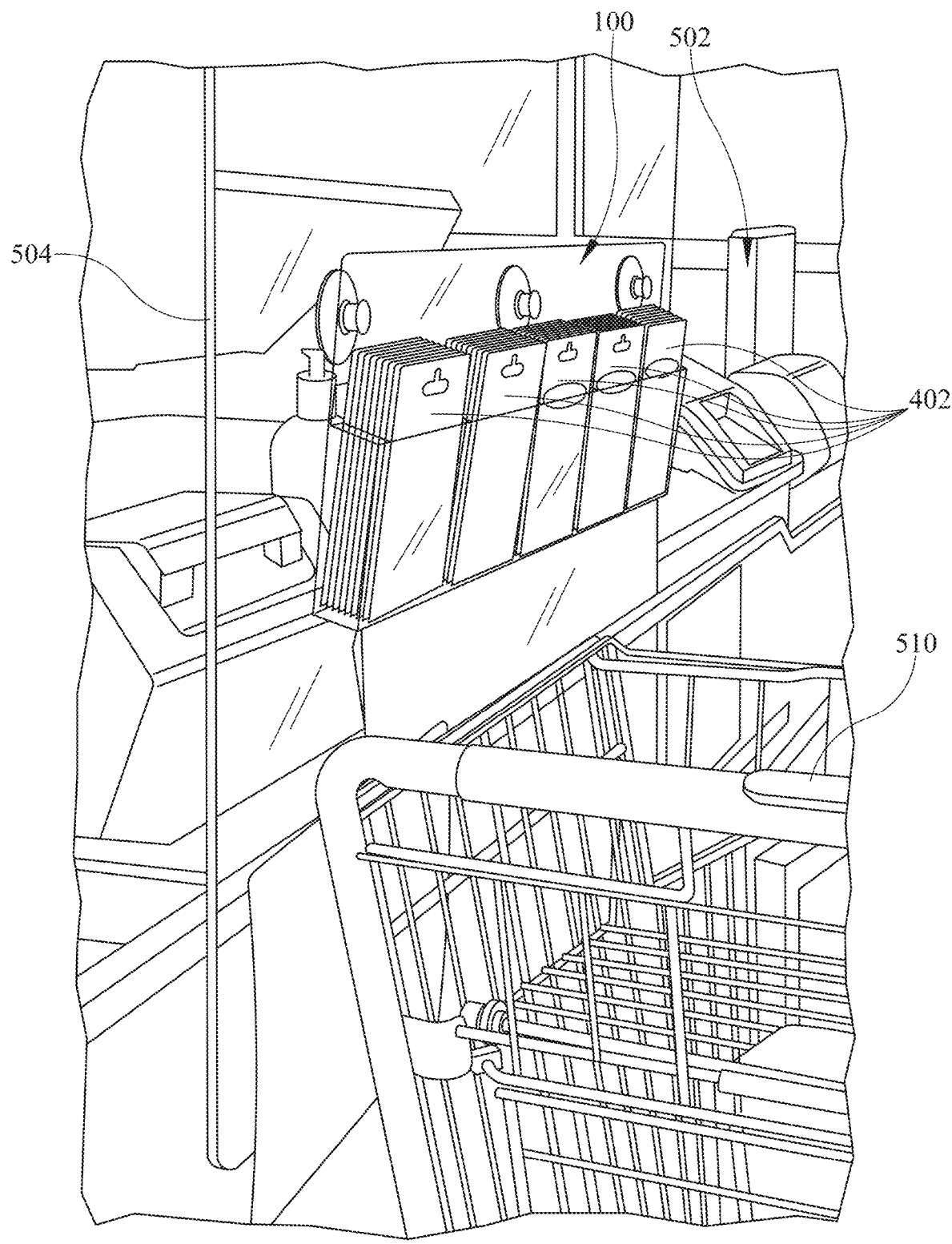
FIG. 5 illustrates a stored-value card display fixture located at a point of sale according to an embodiment of the disclosure.

FIG. 5 illustrates stored-value card display fixture 100 located at a point of sale 502, affixed to other substrate 504 via affixing components 112 and displaying stored-value card packages 402, wherein stored-value card display fixture 100 is positioned above a height of shopping cart 510 to avoid contact with shopping cart 510.

In an embodiment, where a chit comprising an indicia of a product is selected by a customer from the stored-value card display fixture, a customer may use its smart device (e.g., smart phone, watch, or personal digital assistant) to scan, read, and or otherwise interpret the indicia on the selected chit and provide (or have provided) the chit's selected indicia to the point of sale to effectuate the customer's purchase, acceptance of an offer or opportunity, and/or activation of the product associated with the chit. In an embodiment the indicia of the chit scanned, read, or otherwise interpreted by the customer's smart device may be an intelligent code, a QR code, a magnetic stripe, a bar code, an RFID tag, or other readable indicia. In an embodiment, the product may be a stored-value card, and electronic stored-value card, an item which is required to be stored securely and/or apart from customers (e.g., cigarettes or lottery tickets), or a physically attachable/affixable indicator which comprises a QR code, a magnetic stripe, a bar code, an RFD tag, or other readable indicia, wherein the physically attachable/affixable indicator may be associated with another purchased item or item in the customer's possession. For example, the customer may select the chit, scan the indicia, and the clerk at the point of sale will then provide the customer with the product associated with the chit, e.g., cigarettes. For further examples of a customer scanning a chit with an intelligent code to receive a selected product, U.S. patent application Ser. No. 14/085,394, entitled "System and Method for Using Intelligent Codes in Conjunction with Stored-Value Cards" is hereby referenced and incorporated in its entirety.

In an additional embodiment, where an indicia of a product and/or multiple indicia of different products are affixed or otherwise associated with the stored-value card display fixture, a customer may use its smart device (e.g., smart phone, watch, or personal digital assistant) to scan, read, and or otherwise interpret selected product indicia and provide (or have provided) the selected product indicia to the point of sale to effectuate the customer's purchase, acceptance of an offer or opportunity, and/or activation of the selected product, all without removing any product or item from the stored-value card display fixture. In an embodiment the indicia of the product scanned, read, or otherwise interpreted by the customer's smart device may be a QR code, a magnetic stripe, a bar code, an RFID tag, or other readable indicia. In an embodiment, the product may be a stored-value card, an electronic stored-value card, an item which is required to be stored securely and/or apart from customers (e.g., cigarettes or lottery tickets), or a physically, attachable/affixable indicator which comprises a QR code, a magnetic stripe, a bar code, an RFID tag, or other readable indicia, wherein the physically attachable/affixable indicator may be associated with another purchased item or item in the customer's possession. For example, the physically attachable/affixable indicator may comprise a decal which may be applied to a stuffed animal, wherein the decal is fashioned to indicate that its readable indicia may be read to activate an electronic stored-value card worth $20, which may be delivered to a recipient's account or electronic wallet—so as to increase the monetary value of the sentimental stuffed animal gift. In an embodiment, the readable indicia may be read to provide the recipient with other forms of value.

An attached Appendix comprises additional images of one or more embodiments of a stored-value card display fixture disclosed herein.

While embodiments of the present disclosure have been shown and described, modifications thereof can be made by one skilled in the art without departing from the spirit and teachings of the disclosure. The embodiments described herein are exemplary only, and are not intended to be limiting. Many variations and modifications of the disclosure are possible and are within the scope of the invention. Use of the term "optionally" with respect to any element of a claim is intended to mean that the subject element is required, or alternatively, is not required, Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Background is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed above and throughout the text are provided solely for their disclosure prior to the filing date of the present application. Nothing herein is to be construed as an admission that the inventors are not entitled to antedate such disclosure by virtue of prior invention.

Unless indicated otherwise, when a range of any type is disclosed or claimed it is intended to disclose or claim individually each possible number that such a range could reasonably encompass, including any sub-ranges encompassed therein. When describing a range of measurements every possible number that such a range could reasonably encompass can, for example, refer to values within the range with one significant digit more than is present in the end points of a range. Moreover, when a range of values is disclosed or claimed, which Applicants intent to reflect individually each possible number that such a range could reasonably encompass, Applicants also intend for the disclosure of a range to reflect, and be interchangeable with, disclosing any and all sub-ranges and combinations of sub-ranges encompassed therein. Accordingly, Applicants reserve the right to proviso out or exclude any individual members of any such group, including any sub-ranges or combinations of sub-ranges within the group, if for any reason Applicants choose to claim less than the full measure of the disclosure.

What is claimed is:

1. A method for displaying stored-value cards comprising a stored-value card display fixture, the stored-value card display fixture configured to be converted from a compressed configuration to a presentation configuration, wherein the stored-value card display fixture comprises a back portion, a front portion, a top portion, and a bottom portion, and wherein the stored-value card display fixture consists essentially of a single component, wherein the back portion, the front portion, the top portion, and the bottom portion are all formed in a connected state from a single substrate, and wherein the single component is configured for forming a plurality of pockets sized to display the stored-value cards when converted from the compressed configuration to the presentation configuration.

2. The method of claim 1 further comprising converting the compressed configuration to the presentation configuration by actuating the stored-value card display fixture along a plurality of scored, folded, bent, or combinations thereof portions the stored-value card display fixture.

3. The method of claim 2 wherein the presentation configuration is configured to present the at least one pocket for accepting at least one product.

4. The method of claim 1 wherein the compressed configuration comprises at least one product.

5. The method of claim 2 wherein the compressed configuration comprises at least one product.

6. The method of claim 4 wherein the stored-value card display fixture is shipped to a point of sale location with the at least one product.

7. The method of claim 4 wherein the at least one product is a stored-value card.

8. The method of claim 5 wherein the at least one product is a stored-value card.

9. The method of claim 6 wherein the at least one product is a stored-value card.

10. The method of claim 1 wherein stored-value card display fixture comprises a color-modifiable appearance.

11. The method of claim 10 wherein a first portion of the stored-value card display fixture is configurable to appear in a different color, appear with a different opacity, or combinations thereof, than a remainder of the stored-value card display fixture.

12. The method of claim 1 wherein stored-value card display fixture comprises a notification component.

13. A stored-value card display fixture configured to be converted from a compressed configuration to a presentation configuration, wherein the stored-value card display fixture comprises a back portion, a front portion, a top portion, and a bottom portion, and wherein the stored-value card display fixture consists essentially of a single component, wherein the back portion, the front portion, the top portion, and the bottom portion are all formed in a connected state from a single substrate, and wherein the single component is configured to form a plurality of pockets sized to display the stored-value cards when converted from the compressed configuration to the presentation configuration.

14. The stored-value card display fixture of claim 13, wherein the stored-value card display fixture is folded, cut, scored, bent, or combinations thereof to form the at least one pocket.

15. The stored-value card display fixture of claim 14 wherein the compressed configuration comprises at least one product.

16. The stored-value card display fixture of claim 15 wherein the at least one product comprises a stored-value card.

17. A system for displaying at least one product comprising a stored-value card display fixture configured to be converted from a compressed configuration to a presentation configuration, wherein the stored-value card display fixture comprises a back portion, a front portion, a top portion, and a bottom portion, and wherein the stored-value card display fixture consists essentially of a single component, wherein the back portion, the front portion, the top portion, and the bottom portion are all formed in a connected state from a single substrate, and wherein the single component is configured to form a plurality of pockets sized to display the stored-value cards when converted from the compressed configuration to the presentation configuration.

\* \* \* \* \*